Figure 1:
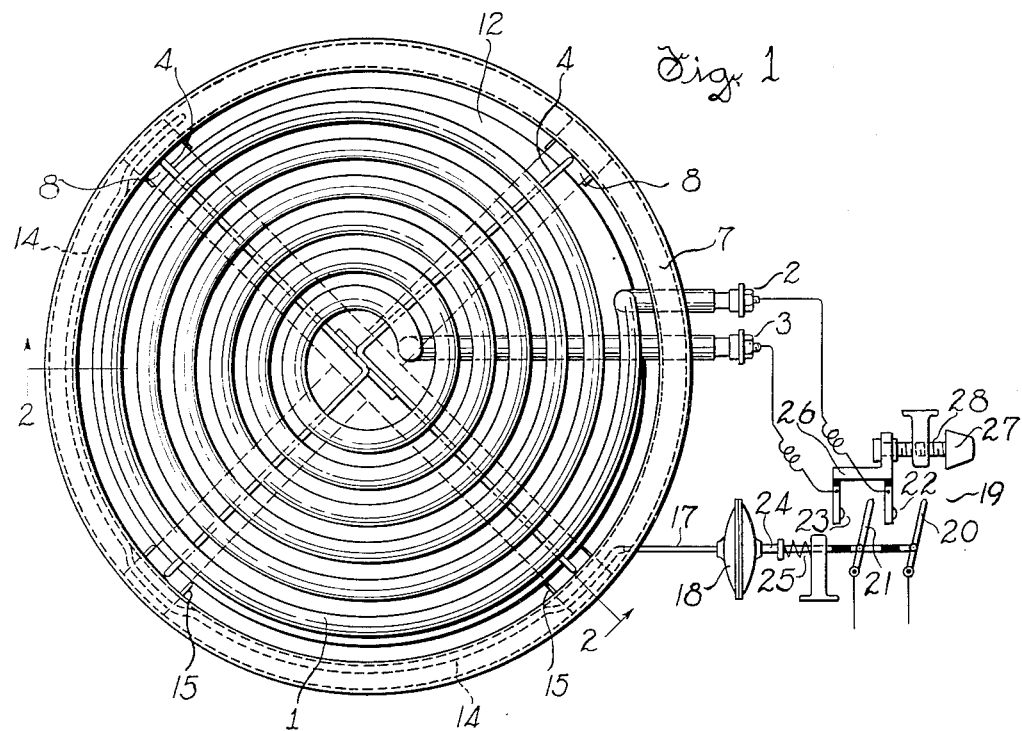

March 5, 1946.   E. N. LIGHTFOOT   2,396,183
CONTROL FOR ELECTRIC HEATERS OPERATING IN UNENCLOSED SPACE
Original Filed Nov. 3, 1938

Inventor
Edwin N. Lightfoot
By Frank N. Hubbard
Attorney

Patented Mar. 5, 1946

2,396,183

UNITED STATES PATENT OFFICE 2,396,183

CONTROL FOR ELECTRIC HEATERS OPERATING IN UNENCLOSED SPACE

Edwin N. Lightfoot, Wauwatosa, Wis., assignor to Cutler-Hammer, Inc., Milwaukee, Wis., a corporation of Delaware Continuation of application Serial No. 238,595, November 3, 1938. This application September 2, 1941, Serial No. 409,176

2 Claims. (Cl. 219—37)

This invention relates to control of high temperature radiant heaters operating in unenclosed space, and particularly to control of stove tops of such type and of tubular form.

This application is a continuation of my application Serial No. 238,595, filed November 3, 1938.

Heretofore it has been proposed to associate with a low temperature heater operating in open space a thermostat to which heat is transferred from the heater, the thermostat being utilized to control circuit making and breaking means for the heater in a manner to afford the heater limited automatic regulation, and the present invention has among its objects to carry forward this type of control adapting it to high temperature radiant heaters and to modern equipment embodying such heaters.

No stove top is now acceptable unless its heater is readily removable free of encumbrances for cleaning, and whereas the aforementioned earlier controls require attachment of the control thermostats to the heaters it is an object of the present invention to obviate this need and to have the heater removable without displacement of its thermostat or any control element.

In the aforementioned earlier controls the thermostats are attached to the heaters for heat transfer by conduction, and it is an object of the present invention to obviate need of heat transfer by conduction and to provide a control better adapted to high temperature radiant heaters, and particularly those of the tubular type which preferably has a minimum of surface area in contact with supporting or other parts which may conduct heat away from the object to be heated.

Various other objects and advantages of the invention will hereinafter appear.

In further explanation of the control contemplated it may be stated that full automatic control such as has been provided for ovens and the like is not proposed, for it is to be understood that as in the earlier controls aforementioned it is necessary in order to attain a given temperature level that the thermostatic control means be adjusted manually taking into account the particular set of conditions to be dealt with, this becoming a simple matter as experience is acquired. On the other hand, it is proposed to provide for attainment of a given temperature level according to the adjustment of the thermostatic control means and automatically to maintain within reasonably close limits such temperature level for that set of conditions obtaining at the time of adjustment. Readjustment may of course be made at any time.

According to the present invention it is proposed to rely mainly on heat transfer by radiation for the desired action of the control thermostat, the effects of conduction and convection being negligible and probably non-essential. Thus the thermostat may be and is supported separately from the heater, leaving the latter free for removal independently of the former. Actually the heater and thermostat are in a spaced relation, the relation being governed largely by the type of thermostat employed and the type of thermostat being an important factor. Preferably the thermostat is of the liquid expansion type and where such type of thermostat is employed its relation to the heater must be such as to protect it against overheating with consequent vaporization of its liquid fill. On the other hand, it is also important to have the thermostat in a relation to the heater such that the desired sensitivity of the former is obtained. Both protection and sensitivity have been obtained in the construction hereinafter set forth.

An embodiment of the invention is illustrated in the accompanying drawing which will now be described, it being understood that the invention is susceptible of embodiment in other forms without departing from the scope of the appended claims.

Figure 2:
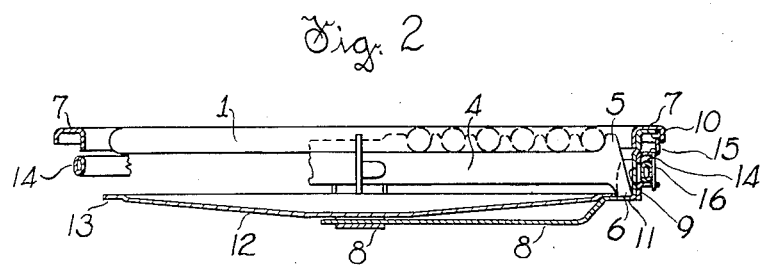

In the drawing,

Figure 1 is a top plan view of a tubular heater type of stove top having associated therewith a thermal element, this figure also showing diagrammatically a regulator of which said thermal element constitutes a part, and Fig. 2 is a sectional view taken on line 2—2, Fig. 1.

Referring to the drawing, the stove top selected for illustration comprises a continuous tubular heater 1 formed into a flat spiral, its terminal portions 2 and 3 being brought together at one side of the spiral. As will be understood, heaters of the tubular type commonly comprise a bendable seamless metal sheath containing a helical resistor embedded in and surrounded by granular insulation, the sheath being swaged to compact the insulation to a hard dense mass. Also as will be understood, this type of heater is now designed for high temperatures.

The spirally wound tubular heater is carried by a support comprising four strips 4 of suitable material suitably secured together centrally of the coiled heater. These strips extending radially of the heater present their edges to the heater for support of all coils thereof in a common plane. As shown in Fig. 2, each strip may have at its outer end an upwardly extending lug 5 to confine the heater and a downwardly extending foot 6.

For receiving the thus supported heater there is shown an annular frame comprising a finishing ring 7 of channel form, as best shown in Fig. 2, carrying two cross straps 8 arranged at right angles. The two cross straps are alike, each having at opposite ends upstanding portions 9 terminating in right angle portions 10 to fit within and to be welded to the ring 7. Also each strap has a right angle formation adjacent the lower ends of the upturned portions 9 to form horizontal ledges 11, these ledges being slightly offset from the intermediate portion of the strap. This frame is adapted to be suitably supported in a range, the nature of the support being immaterial, and hence not being illustrated.

Within the frame is mounted a suitable reflector 12 having a peripheral rim 13 to rest on the ledges 11 of the straps 8. The heater fits removably within the frame, the feet 6 of its support resting on the ledges 11 beyond peripheral flange 13 of the reflector, and the terminal portions of the heater extending outwardly beneath the ring 7.

As aforeindicated, it is preferred to employ a thermal element having an expansible liquid fill, and this element is shown as comprising a tube 14 of suitable length bent on a radius substantially the same as that of the ring 7 and supported beneath said ring on the upstanding portions 9 of the straps 8. As illustrated the upstanding portions 9 of the straps 8 have suitably secured thereto U-shaped brackets 15 to receive the tube 14 and pins 16 to retain said tube in the brackets, the pins preferably being removable.

In practice it is desired to have the thermal element coextensive with a substantial part of the outer turn of the heater, and as shown it extends slightly more than half way around the heater whereby it is supported by the straps 8 at three points. Between its points of support the thermal element, as will be apparent, is exposed to receive heat radiated from the heater and for exposure of an increased surface area of the thermal element the tube of which it is formed is preferably flattened as shown.

Such mounting of the thermal element has been found feasible even where the liquid fill of such element has a relatively low vaporization point, but it will, of course, be understood that the distance between the thermal element and the heater might be increased for greater protection of the thermal element, although as will be obvious it is desirable to have the thermal element as close to the heater as is feasible. With the arrangement illustrated it will, of course, be apparent that the thermal element is heated mainly by heat radiated from the heater and that the heater is removable from the frame without disturbing the thermal element.

As schematically and diagrammatically illustrated in Fig. 1, the thermal element is connected through a capillary tube 17 to a diaphragm 18 which is employed to control a switch 19 for making and breaking the circuit of the heater.

The switch is shown as comprising two movable contacts 20 and 21 to engage respectively relatively stationary contacts 22 and 23. The contacts 20 and 21 are connected to a sliding member 24 bearing against the diaphragm 18 under the pressure of a spring 25 which constitutes a loading spring for the diaphragm and which biases said contacts toward their cooperating stationary contacts. The contacts 22 and 23 are carried by a sliding member 26 adjustable by knob 27 through the medium of a screw 28.

The switch 19 is shown as of the slow make and break type, this type of switch being preferred where the heater is supplied with alternating current, but it is, of course, to be understood that the switch may be of the snap type if desired and that the desired adjustment thereof might be obtained in various other well known ways. As shown the range of adjustment of the contacts 22 and 23 is such that they may be moved out of reach of the contacts 20 and 21 to enable opening of the switch at will through the medium of the knob 27. When the contacts 22 and 23 are brought within reach of contacts 20 and 21 the former may then be adjusted by the knob 27 to shift the range of temperature change through which the contacts remain in engagement, the temperature difference between the limits of the range remaining substantially constant.

In considering the operation of the embodiment illustrated it is to be borne in mind that usually it is desired to effect the desired temperature rise as quickly as possible and to maintain the temperature level constant until the operation is completed or until some definite change in level is desired. The utensil to be heated and its contents may and usually does have a relatively high thermal capacity as compared to that of the heater. The thermal element associated with the heater has a relatively small thermal capacity and the regulator as a unit has high sensitivity.

To start heating operation adjustment must be made to permit closure of the switch and according to the final adjustment the switch will remain closed until the thermal element responds to effect opening of the switch. In the meantime the contents of the heated utensil may or may not have attained or closely approached their ultimate temperature level. If it has not attained such temperature level the thermal means will shortly effect reclosure of the switch, again causing the heater to supply heat, and such cycle will be repeated when necessary until a temperature level which is a function of the adjustment is attained, it being understood that each time the heater is energized it effects some temperature rise within the heated vessel. After attainment of the desired level the thermal means disconnects the heater but reconnects it upon a relatively small reduction in temperature of the thermal element. Accordingly the regulator tends to maintain the temperature level determined by the adjustment of the regulator.

As will be understood, the temperature level for any given setting of the adjustment will vary with the varying demand on the heater and thus the adjustment of the regulating means must be made having due regard to the various factors determining the demand on the heater as well as to the temperature level desired. Thus proper adjustment will involve a certain amount of experience or skill, but it has been found that a user will soon learn to make the adjustments needed for the desired control of the heat supply.

As will be apparent, the control and/or regulation herein set forth is applicable to other types of heaters than that selected for illustration and may employ other forms of thermal element and circuit controlling means.

What I claim as new and desire to secure by Letters Patent is:

1. The combination with a high temperature radiant tubular heater operating in open space and being supported in a fixed position, said heater being of flat spiral form, of a fixed finishing ring surrounding said heater, and thermally responsive means to make and break the circuit of said heater for automatic control thereof, said means comprising and functioning in response to a fluid containing thermal element having substantially the same curvature as that of said ring and being supported beneath said ring in a relation to said heater to be influenced by and to be functionally dependent upon heat radiated to it by said heater and to be influenced little, if any, by conduction of heat to it from said heater.

2. The combination with a high temperature radiant tubular heater of flat spiral form, of thermally responsive means to make and break the circuit of said heater for automatic control thereof, said means comprising and functioning in response to a liquid expansion type thermal element, and supporting means for said heater supporting it in a fixed position for operation in open space and affording said heater ready removability, said supporting means comprising means also to support said thermal element independently of said heater fixedly and adjacent the periphery of said heater to be functionally influenced by heat transferred from said heater by radiation and being restrictive of heat conduction therethrough from said heater to said element to a degree to render of little, if any, influence on said element the heat so conducted, said thermal element being of tubular form curved longitudinally on an arc approximating that of the outer convolution of said heater.

EDWIN N. LIGHTFOOT.